(12) United States Patent
Fujiyoshi et al.

(10) Patent No.: US 8,400,799 B2
(45) Date of Patent: *Mar. 19, 2013

(54) INVERTER CIRCUIT WITH CONTROLLER FOR CONTROLLING SWITCHING ELEMENTS BASED ON A MAGNITUDE OF OUTPUT POWER

(75) Inventors: Toshikazu Fujiyoshi, Osaka (JP); Hajime Katsushima, Osaka (JP); Kenji Morimoto, Osaka (JP); Satoshi Yamamura, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 272 days.

This patent is subject to a terminal disclaimer.

(21) Appl. No.: 12/740,432

(22) PCT Filed: Feb. 6, 2009

(86) PCT No.: PCT/JP2009/052036
§ 371 (c)(1),
(2), (4) Date: Apr. 29, 2010

(87) PCT Pub. No.: WO2010/089875
PCT Pub. Date: Aug. 12, 2010

(65) Prior Publication Data
US 2011/0216557 A1  Sep. 8, 2011

(51) Int. Cl.
*H02M 5/42* (2006.01)
*H02M 7/68* (2006.01)
*H02M 3/24* (2006.01)
*H02M 7/44* (2006.01)
*H02M 7/5387* (2007.01)
*H02M 3/335* (2006.01)

(52) U.S. Cl. ............................ 363/98; 363/24; 363/132
(58) Field of Classification Search ............... 363/15–17, 363/56.01–56.12, 97, 98, 24–25, 131–132
See application file for complete search history.

(56) References Cited

U.S. PATENT DOCUMENTS
(Continued)

FOREIGN PATENT DOCUMENTS
JP  08-223931  8/1996
JP  2003-219653  7/2003
(Continued)

OTHER PUBLICATIONS

International Search Report for corresponding International Application No. PCT/JP2009/052036 mailed Mar. 31, 2009 in English.
Search Report for corresponding International Application No. PCT/JP2009/052036 mailed Mar. 31, 2009.

*Primary Examiner* — Jue Zhang
(74) *Attorney, Agent, or Firm* — Renner, Otto, Boisselle & Sklar, LLP

(57) ABSTRACT

This inverter circuit includes first and second switching elements and an output transformer which is provided with a first primary winding connected in series between said first and second switching elements, and also with a secondary winding for obtaining an output voltage. The inverter circuit is further provided with a first voltage supply, a second voltage supply, and a control unit. The first voltage supply applies voltage to said first switching element via said first primary winding. And the second voltage supply applies voltage to said second switching element via said second primary winding. The control unit turns said first switching element and said second switching element alternatingly ON and OFF. This inverter circuit also includes first and second regeneration snubber circuits for regenerating the charge charged into snubber capacitors.

4 Claims, 8 Drawing Sheets

U.S. PATENT DOCUMENTS

| | | | | |
|---|---|---|---|---|
| 4,797,630 A | * | 1/1989 | Brown | 330/264 |
| 4,926,302 A | * | 5/1990 | Harada et al. | 363/132 |
| 6,914,788 B2 | * | 7/2005 | Fujiyoshi et al. | 363/131 |
| 8,094,469 B2 | * | 1/2012 | Fujiyoshi et al. | 363/24 |
| 2002/0054499 A1 | * | 5/2002 | Tanaka et al. | 363/132 |
| 2003/0214271 A1 | * | 11/2003 | Bradley | 323/222 |

FOREIGN PATENT DOCUMENTS

JP    2003219653 A  *  7/2003

* cited by examiner

INVERTER CIRCUIT WITH CONTROLLER FOR CONTROLLING SWITCHING ELEMENTS BASED ON A MAGNITUDE OF OUTPUT POWER

TECHNICAL FIELD

The present invention relates to an inverter circuit which includes a snubber circuit and a regeneration circuit on the primary side of a transformer.

BACKGROUND ART

With an inverter circuit, a snubber circuit is connected in parallel with a switching element, in order, when the switching element is turned off, to prevent surge voltage from being applied to the switching element due to the operation of leakage inductance between the primary side and the secondary side of a transformer. Furthermore, it has also been proposed to provide a regeneration circuit which regenerates charge which has been charged into a snubber capacitor of the snubber circuit to the power supply. By providing this regeneration circuit, this charge is not dissipated as heat by a snubber resistor, and moreover it is possible to improve the efficiency of the inverter circuit, since the energy for charging the snubber capacitor is regenerated to the power supply.

The inverter disclosed in Patent Document #1 is one which, as described above, is provided with a snubber circuit and a regeneration circuit. In the circuit of this inverter, a first switching element and a second switching element are connected to the primary side. The snubber circuit is connected in parallel with the first switching element. Moreover, the regeneration circuit is connected between the snubber circuit and the power supply. The snubber circuit consists of a series circuit of a snubber diode and a snubber capacitor. And the regeneration circuit consists of a series circuit of a switching element for regeneration, a reactor, and a diode for regeneration. A snubber circuit and a regeneration circuit are connected to the second switching element as well, in a similar manner.

With the inverter circuit described above, a control unit turns the first switching element and the second switching element on and off alternatingly, so that the switching element for regeneration is turned on for just a fixed time period. When the switching element for regeneration is turned on, the charge which is charged into the snubber capacitor is discharged perfectly, and is regenerated to the power supply.
Patent Document #1: Japanese Laid-Open Patent Publication 2003-219653.

SUMMARY OF THE INVENTION

Problems to be Solved by the Invention

However, with the inverter circuit described above, due to the perfect charging and discharging of the snubber capacitor being repeated, sometimes it happens that the total of the loss due to the current during this discharging and the loss due to the current during this charging becomes greater than the amount of improvement of the loss during switching of the switching element to off. This phenomenon appears at times of low load, as explained below.

Now, consider the case when the switching element has been turned off. Since the accumulated energy of the above described leakage inductance is charged into the snubber capacitor, the voltage between the two ends of the switching element gradually rises. Due to this, switching off becomes a ZVS (Zero Voltage Switching) operation, so that it is possible to improve the loss during switching off.

However, since the current which flows in the switching element is small at times of low load, accordingly the loss would not be all that great during switching off even if ZVS operation were not performed. Accordingly, at times of low load, sometimes it transpires that the loss due to charging and discharging of the snubber capacitor becomes greater than the amount of improvement of the loss due to ZVS operation.

In this manner, with an inverter circuit as disclosed in the above described Patent Document #1, there has been the problem that the efficiency becomes poor at times of low load.

Accordingly, the object of the present invention is to provide an inverter circuit whose efficiency is high, irrespective of the magnitude of the load.

Means for Solving Problem

The inverter circuit of the present invention includes:
a first switching element;
a second switching element;
an output transformer, a primary side whereof is supplied with current via the first switching element and the second switching element, and from a secondary side whereof a current is outputted to a load;
a first free wheel diode connected in inverse parallel to the first switching element;
a second free wheel diode connected in inverse parallel to the second switching element;
a first snubber circuit, connected in parallel to the first switching element, and comprising a series circuit of a first snubber diode and a first snubber capacitor;
a second snubber circuit, connected in parallel to the second switching element, and comprising a series circuit of a second snubber diode and a second snubber capacitor;
a voltage supply which applies voltage to the first switching element and to the second switching element;
a first regeneration circuit connected between the first snubber circuit and the voltage supply; and
a second regeneration circuit connected between the second snubber circuit and the voltage supply.

The first switching element and the second switching element may, for example, consist of IGBTs (Insulated Gate type Bipolar Transistors) or MOS-FETs. The application of surge voltage to the first switching element and the second switching element is prevented by the operation of the first snubber circuit and the second snubber circuit, and the charges in the snubber circuits are regenerated to the power supply by the first regeneration circuit and the second regeneration circuit.

The first regeneration circuit includes a series circuit of a third switching element, a first reactor, and a first diode for regeneration.
The second regeneration circuit includes a series circuit of a fourth switching element, a second reactor, and a second diode for regeneration.

Moreover, this inverter circuit also comprises a control unit which turns the first switching element and the second switching element alternatingly ON and OFF, and also turns the third switching element and the fourth switching element alternatingly ON and OFF. As will be explained hereinafter, the characteristic feature of the present invention is the fact that the time period Tb over which the third switching element and the fourth switching element are turned alternatingly ON and OFF is controlled by this control unit according to the magnitude of the output power.

The control unit turns the third switching element to ON for just the interval Tb from turning the first switching element ON. When this third switching element is turned ON, the first regeneration circuit regenerates the change in the first snubber capacitor to the power supply via the first diode for regeneration. At this time, the control unit controls the length of the interval Tb according to the magnitude of the output power, as detected by an output detection unit. For a DC-DC converter circuit which outputs a constant voltage, for example, this output detection unit may include a sensor which detects the output current.

For example, the control unit may: when the output current is greater than some fixed current, set the time period Tb to a time period during which the charge in the first snubber capacitor is nearly perfectly discharged; and, when the output current is less than that fixed current, set the time period Tb to a time period during which the charge in the first snubber capacitor is partially discharged. The concept of a time period in which the charge in which the charge in the first snubber capacitor is nearly perfectly discharged, includes the concept of a time period in which the charge is perfectly discharged, and also the concept of a time period in which the charge is approximately perfectly discharged.

As another example, the control unit may: when the output current is greater than some fixed current, set the time period Tb to a time period during which the charge in the first snubber capacitor is nearly perfectly discharged; and, when the output current is less than that fixed current, set the time period Tb to zero.

And, as yet another example, the control unit may set the time period Tb to be shorter, in response to reduction of the output current.

And, for the fourth regeneration circuit, the time period Tb in which the fourth switching element is ON is also controlled by the control unit, in a similar manner to the case for the third regeneration unit described above.

Effects of the Invention

According to the present invention, it is possible to maintain high efficiency in a structure in which a snubber circuit and a regeneration circuit are provided, irrespective of the level of output power.

EXPLANATION OF REFERENCE NUMBERS

S1—first switching element
S2—second switching element
S3—third switching element
S4—fourth switching element
SB1—first snubber circuit
SB2—second snubber circuit
RG1—first regeneration circuit
RG2—second regeneration circuit
CNT—control unit

BEST MODE FOR CARRYING OUT THE INVENTION

Figure 1:
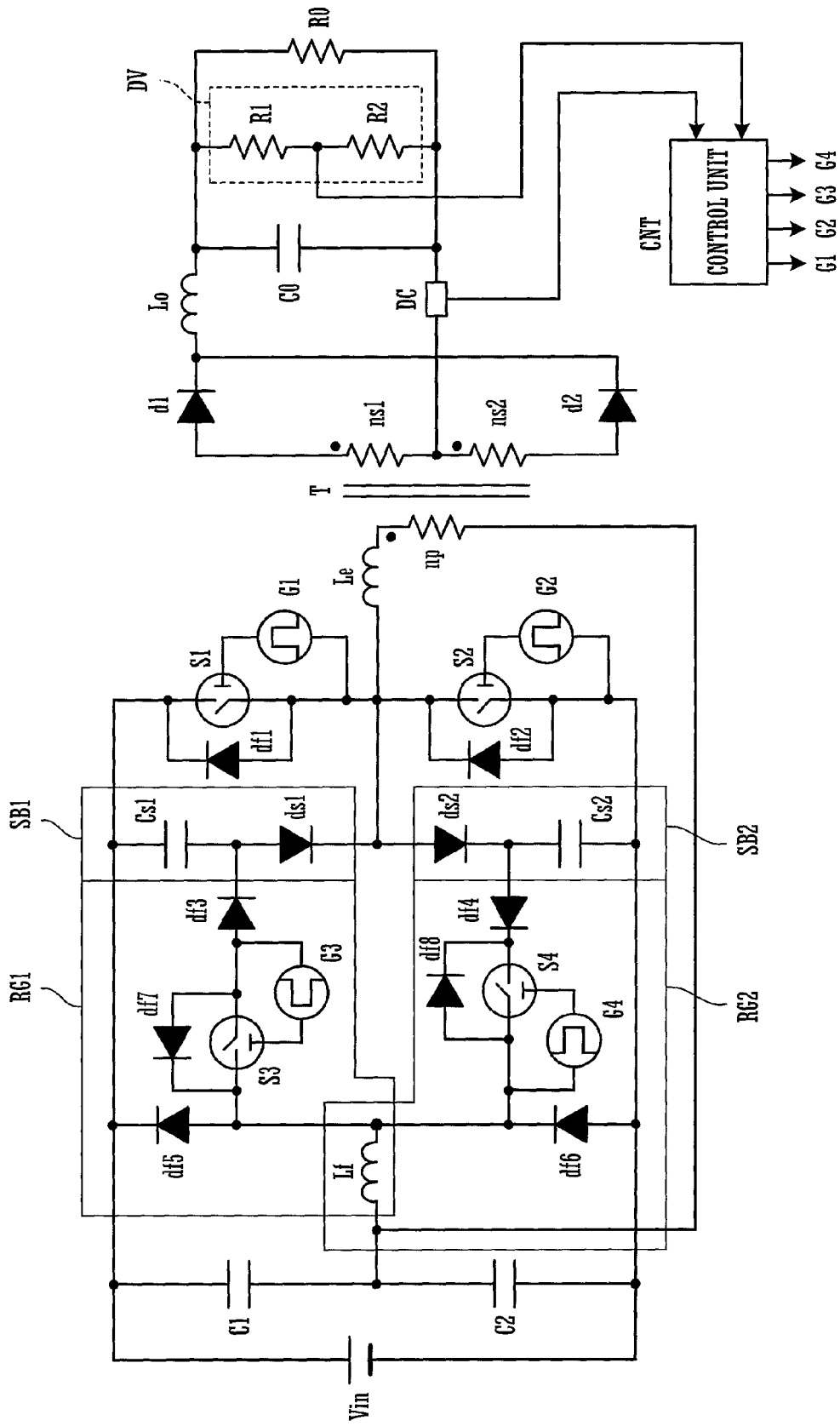
FIG. 1 is a circuit diagram of a DC-DC converter circuit which is a first embodiment of the present invention.

FIG. 1 is a circuit diagram of a DC-DC converter circuit which is a first embodiment of the present invention. This DC-DC converter circuit includes an inverter circuit, a rectification circuit which is connected to the secondary side of an output transformer T (hereinafter termed the "transformer"), and a control unit CNT.

The inverter circuit includes a first switching element S1 and a second switching element S2 which are connected in series, and a first terminal of a primary side winding of the transformer T is connected to the connection point of these switching elements. A power supply Vin is connected in parallel to a series circuit of a first voltage supply capacitor C1 and a second voltage supply capacitor C2, and a second terminal of the primary side winding of the transformer T is connected to the connection point of these capacitors C1 and C2. (½)Vin is charged into each of the capacitors C1 and C2. From the above described connection configuration, this inverter circuit operates as a half bridge type inverter circuit.

A free wheel diode df1 is connected to the first switching element S1 in inverse parallel. Moreover, a first snubber circuit SB1 is connected to the switching element S1 in parallel. This first snubber circuit SB1 consists of a series circuit of a first snubber diode ds1 and a first snubber capacitor Cs1. A first regeneration circuit RG1 is connected between the first snubber circuit SB1 and the connection point of a capacitor C1 and a capacitor C2. This first regeneration circuit RG1 comprises a third switching element S3, a reactor Lf, and a first regeneration diode df3. The reactor Lf is connected between the connection point of the capacitor C1 and the capacitor C2 and the third switching element S3. And the first regeneration diode df3 is connected between the third switching element S3 and the first snubber capacitor Cs1

A free wheel diode df2 is connected to the second switching element S2 in inverse parallel. Moreover, a second snubber circuit SB2 is connected to the switching element S2 in parallel. This second snubber circuit SB2 consists of a series circuit of a second snubber diode ds2 and a second snubber capacitor Cs2. A second regeneration circuit RG2 is connected between the second snubber circuit SB2 and the connection point of the capacitor C1 and the capacitor C2. This second regeneration circuit RG2 comprises a fourth switching element S43, the reactor Lf, and a second regeneration diode df4. The reactor Lf is connected between the connection point of the capacitor C1 and the capacitor C2 and the fourth switching element S4. And the second regeneration diode df4 is connected between the fourth switching element S4 and the second snubber capacitor Cs2.

It should be understood that the reactor Lf described above serves in both the first regeneration circuit RG1 and the second regeneration circuit RG2. A diode df5 which is connected between the third switching element S3 and the power supply, and a diode df6 which is connected between the fourth switching element S4 and the power supply, are diodes for preventing reverse current flow.

Diodes d1 and d2 for commutation are connected to the secondary side of a transformer T, and moreover a smoothing reactor $L_0$ and a smoothing capacitor $C_0$ are also connected. And a load $R_0$ is connected to a smoothing output terminal.

Furthermore to the secondary side output circuit there is connected a voltage detection unit DV for detecting output voltage, consisting of a current detection sensor (output detection unit) DC which detects output current, and resistors R1 and R2.

The control unit CNT outputs control signals G1 and G2, and thereby controls the first switching element S1 and the second switching element S2 to turn them alternatingly ON and OFF with the interposition of inactive intervals. This control unit CNT controls the pulse widths of the control signals G1 and G2, so as to keep the output voltage detected by the voltage detection unit DV at a constant voltage. Moreover, the control unit CNT controls the ON time period Tb of the third switching element S3 and the fourth switching element S4, according to the magnitude of the output current detected by the current detection sensor DC, in other words according to the level of the output power. While the details will be described hereinafter, when the output power is greater than or equal to 350 W (i.e. greater than or equal to a constant power level), the time period Tb is set to around $\pi\sqrt{(Lf \cdot Cs)}$, which is half of the resonant period of the reactor Lf and the snubber capacitor Cs (Cs1 or Cs2); while, when the output power is less than 350 W (i.e. less than the constant power level), the time period Tb is set to 150 ns, which is about 0.005 of the switching period T.

Figure 2:
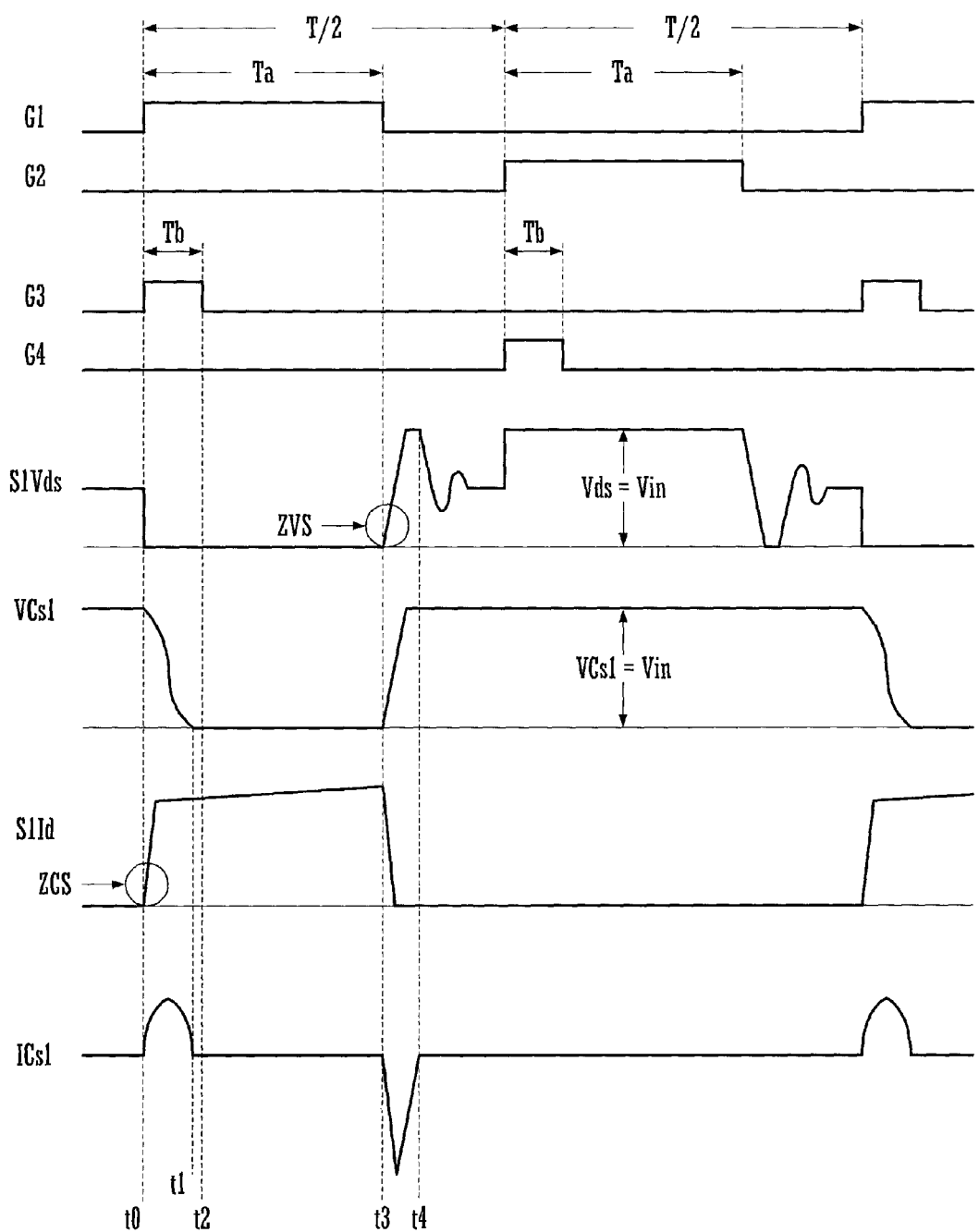
FIG. 2 is a timing chart for a soft switching mode.
Figure 3:
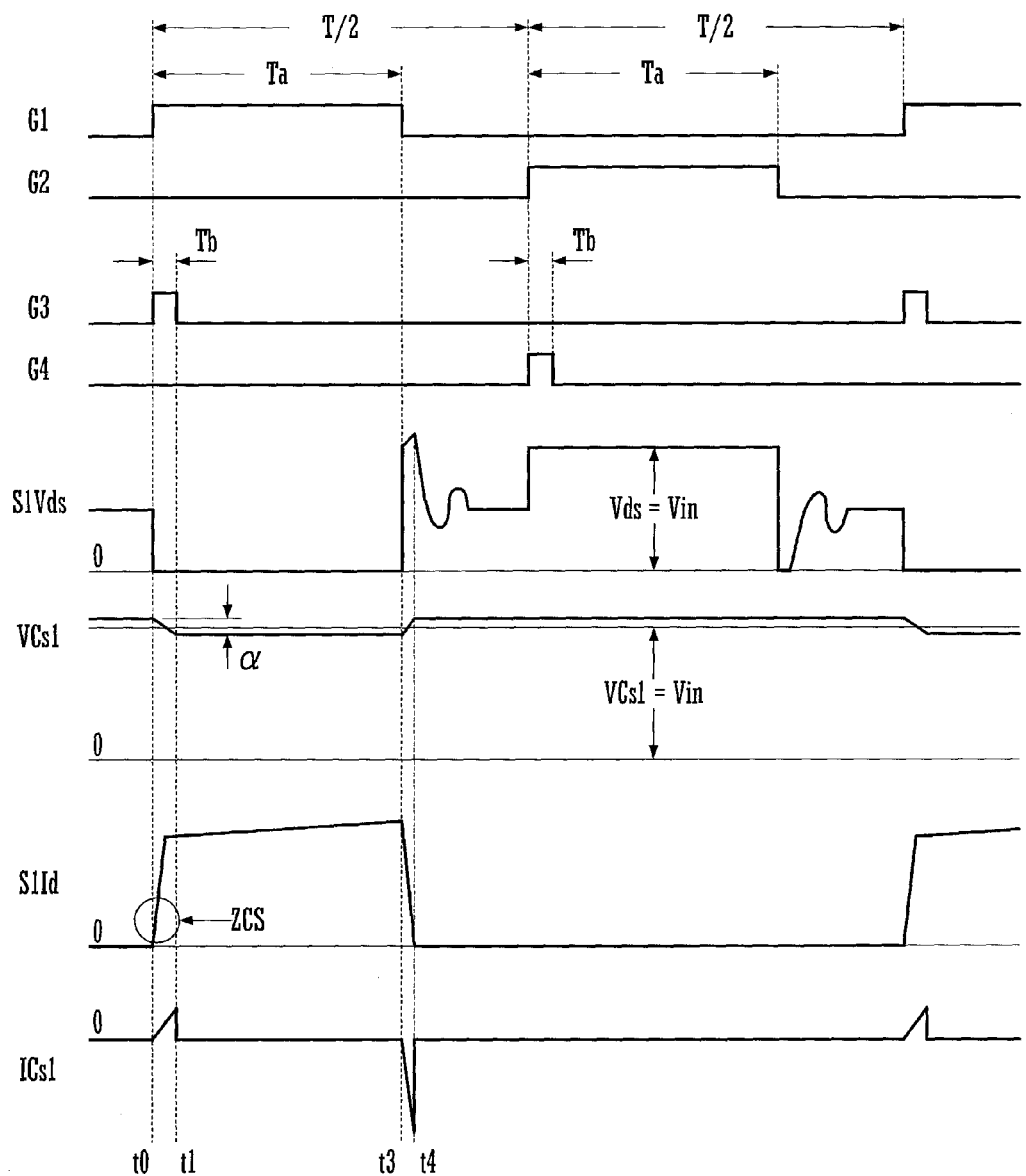
FIG. 3 is a timing chart for a hard switching mode.

FIGS. 2 and 3 are time charts for the DC-DC converter circuit described above. FIG. 2 is a time chart for when the output power is greater than or equal to 350 W, while FIG. 3 is a time chart for when the magnitude of the output power is less than 350 W (i.e. at time of low load). In other words, FIG. 2 is a time chart for when the output current detected by the control unit CNT using the current detection sensor DC is greater than or equal to a fixed value (350 W/the rated voltage), while FIG. 3 is a time chart for when the output current detected by the control unit CNT with the current detection sensor DC is less than the fixed value (350 W/the rated voltage).

The operation when the magnitude of the output current is greater than or equal to the fixed value will now be explained with reference to FIG. 2.

When it is determined by the control unit CNT that the current detected by the current detection sensor DC is greater than or equal to the f fixed value, then the system operates according to the time chart of FIG. 2.

Before the time point t0, since the control signals G1 and G2 are OFF, the first switching element S1 and the second switching element S2 are both OFF. And the voltage S1Vds between the two ends of the switching element S1, just like the voltages VC1 and VC2 of the capacitors C1 and C2, is (½)Vin (where Vin is the power supply voltage).

Because of the charging current due to the energy accumulated in the leakage inductance Le between the primary side winding np of the transformer T and its secondary side winding ns and in the residual inductance of the circuitry, the voltage VCs1 of the snubber capacitor Cs1 is VCs1=Vin. The snubber diode ds1 maintains the voltage of the above capacitor Cs1, in order to prevent discharge of the capacitor Cs1.

At the time point t0, the switching element S1 goes to ON. When this is done, power is supplied via the transformer T to the load R0, and a current S1Id starts to flow in the switching element S1. This current S1Id increases linearly at a fixed slope due to the current reduction operation of the leakage inductance Le between the primary side of the transformer T and its secondary side, and, because of this, the switching ON operation becomes ZCS (Zero Current Switching) operation. At this time, the voltage S2Vds between the two ends of the switching element S2 is equal to Vin.

When the control signal G1 is turned to ON, simultaneously the control unit CNT turns the control signal G3 to ON, and thereby the third switching element S3 is turned ON. Due to the third switching element S3 going to ON, the charge in the first snubber capacitor Cs1 is regenerated to the capacitor C1 by the first regeneration circuit RG1. In other words, in the first regeneration circuit RG1, the reactor Lf for regeneration and the snubber capacitor Cs1 resonate, and the charge in that capacitor Cs1 is regenerated to the capacitor C1 via the reactor for regeneration Lf, the switching element S3, and the diode for regeneration df3.

The control unit CNT turns the switching element S3 to ON for just the time period Tb from the time point t0. This time period Tb is set to a period which is sufficient for the charge in the snubber capacitor Cs1 to be perfectly discharged. In FIG. 2, when the switching element S3 is turned ON at the time point t0, based upon the charge in the snubber capacitor Cs1, the current ICs1 flows in the first regeneration circuit RG1 as a regeneration current. At this time, due to the reactor Lf and the snubber capacitor Cs1 resonating, and moreover due to the operation of the diode for regeneration df3, the current ICs1 which flows from the snubber capacitor Cs1 is the positive half cycle portion of a sine wave current. The time at which the resonant current has become zero (i.e. the time at which half the resonant period $2\pi\sqrt{(Lf \cdot Cs)}$ has elapsed) is the time at which the charge in the snubber capacitor Cs1 has been perfectly discharged, and is the time point t1 in FIG. 2. Thus, the control unit CNT continues to keep the switching element S3 ON until the time point t2, a little after this time point t1. Due to this, all of the charge in the snubber capacitor Cs1 is regenerated to the capacitor C1.

At the time point t3, the control unit CNT turns the control signal G1 to OFF, and due thereto the switching element S1 goes to OFF. When this occurs, the snubber capacitor Cs1 is gradually charged up by the energy accumulated in the leakage inductance Le. Since the voltage S1Vds between the two ends of the switching element S1 at this time gradually rises from the time point t3, this switching OFF operation becomes ZVS (Zero Voltage Switching) operation (hereinafter, this operation will be termed "soft switching"). And, in the latter part of the charging interval, the changing of the potential VCs1 charged into the snubber capacitor Cs1 becomes that due to the above described resonant system of the leakage inductance Le and the snubber capacitor Cs1, and finally is clamped to Vin. This completes half a cycle of operation, and next the control signals G2 and G4 are turned ON by the control unit CNT, so that a similar operation to that described above is performed by the switching element S2, the second snubber circuit SB2, and the second regeneration circuit RG2.

Next, the operation when the magnitude of the output current is less than the fixed value (i.e. at time of low load) will be explained with reference to FIG. 3.

As will be described hereinafter, due to a charging current whose energy source is the leakage inductance Le of the transformer T and the residual inductance of the circuitry, the voltage VCs1 of the snubber capacitor Cs1 is VCs1=Vin+0.5 α. This voltage VCs1 is maintained by the snubber diode ds1.

At the time point t0, the switching element S1 is turned ON. When this occurs, power is supplied to the load $R_0$ via the transformer T, and a current S1Id flows in the switching element S1. This current S1Id increases linearly at a fixed slope due to the current reduction operation of the leakage inductance Le between the primary side of the transformer T and its secondary side, and, because of this, the switching ON operation becomes ZCS (Zero Current Switching) operation. At this time, the voltage S2Vds between the two ends of the switching element S2 is equal to Vin.

When the control signal G1 is turned to ON, simultaneously the control unit CNT turns the control signal G3 to ON, and thereby the third switching element S3 is turned ON. Due to the third switching element S3 going to ON, the charge in the first snubber capacitor Cs1 is regenerated to the capacitor C1 by the first regeneration circuit RG1. Here, the control unit CNT sets the time period Tb between t0 and t1 to the time period which is required for the amount of voltage $0.5\ \alpha$ in the equation $VCs1=Vin+0.5\ \alpha$ to be discharged (i.e., to be regenerated). In concrete terms, if the switching period is T, then Tb is set to a short time period (150 ns) of around 0.005 T.

During this time period Tb, the current ICs1 from the snubber capacitor Cs1 flows to the capacitor C1. The voltage VCs1 drops by just $\alpha$, and the voltage when the time period Tb has elapsed becomes:

$$VCs1=Vin+0.5\ \alpha-\alpha=Vin-0.5\ \alpha.$$

Naturally, even though the switch S1 is ON, due to the discharge prevention operation of the snubber diode ds1, the charge in the capacitor Cs1 is not short circuited by the switching element S1.

When the switching element S1 is turned OFF at the time point t3, the induced voltage in the leakage inductance Le which tries to keep the current S1Id flowing is added to the voltage VC1 (Vin/2), so that:

$$S1Vds=\text{the voltage induced in }Le+Vin/2$$

When this induced voltage becomes equal to Vin/2, the free wheel diode df2 which is connected in parallel with the switching element S2 becomes continuous, so that the current S1Id flows to the capacitor C2, and the energy of the leakage inductance Le is regenerated to the power supply. Due to this, ideally, the above described induced voltage is clamped to Vin/2, so that the voltage S1Vds does not become higher than the voltage Vin.

However, in an actual circuit, duet to the existence of residual inductance other than the leakage inductance Le (for example, due to the presence of residual inductance between the capacitor C1 and the switching element S1, and the presence of residual inductance between the capacitor C2 and the diode df2), and due to continuity delay of the capacitor C2, the voltage S1Vds does rise to higher than the voltage Vin. The capacitor Cs1 which is connected in parallel with the switching element S1 via the diode ds1 is charged up by this energy. And during the time period t3 to t4 the voltage VCs1 rises by just $\alpha$, so that, at this time, the voltage VCs1 becomes:

$$VCs1=Vin-0.5\ \alpha+\alpha=Vin+0.5\ alpha$$

It should be understood that, since in the time period t3 to t4 the voltage of the capacitor Cs1 is already charged up to $Vin-0.5\ \alpha$, the slope of the voltage S1Vds is steep. Due to this, the switching OFF operation does not become ZVS operation (hereinafter, this operation will be termed "hard switching").

When the current S1Id becomes zero at the time point t4, via ringing due to the resonance between the leakage inductance Le and the residual inductance of the circuitry, and the output capacitance of the switching element S1 and the floating capacitance, the voltage Vds converges to the voltage 0.5 Vin.

And the voltage VCs1 of the capacitor Cs1 is maintained at $Vin+0.5\ \alpha$ by the discharge prevention action of the diode ds1. This operation terminates after half a cycle, and then the control signals G2 and G4 are turned ON by the control unit CNT, so that a similar operation to that described above is performed by the switching element S2, the second snubber circuit SB2, and the second regeneration circuit RG2.

Since in FIG. 2 the voltage S1Vds is subjected to ZVS operation, the mode here is termed the soft switching mode. And, since in FIG. 3 the voltage S1Vds is not subjected to ZVS operation, the mode here is termed the hard switching mode (as will be described hereinafter, this is a second mode, in which Tb>0).

In the example described above, when the output current is less than the fixed current, the time period Tb is set to 150 ns, which is 0.005 of the switching period T; but there is also the option of setting this time period Tb to zero.

Figure 4:
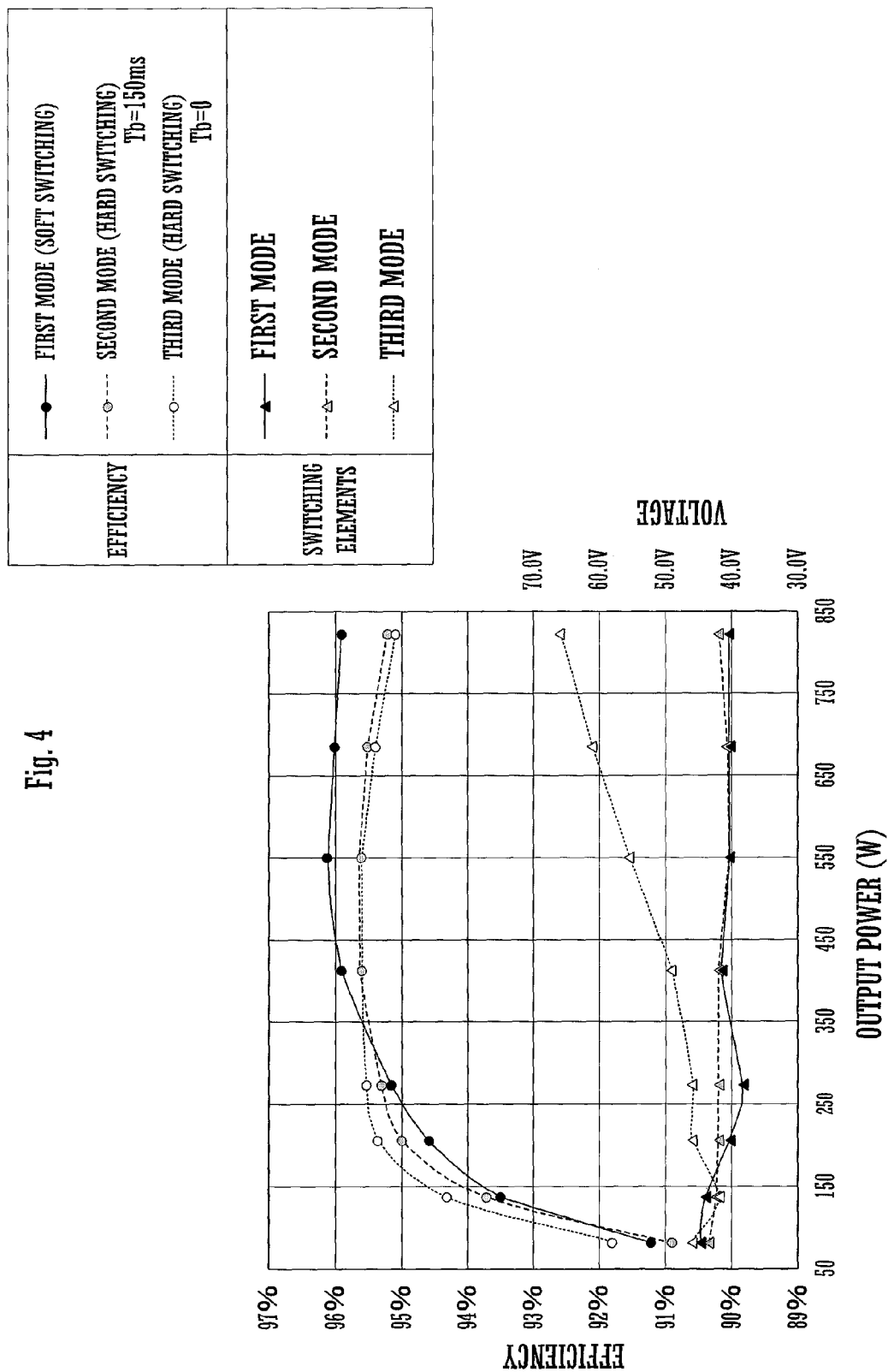
FIG. 4 is a figure showing, in various modes, the efficiencies and the voltages between the two sides of switching elements.

FIG. 4 shows the efficiency of the circuit when the time period Tb is set in the three modes.

The first mode is the soft switching mode shown in FIG. 2. And the second and third modes are the hard switching mode shown in FIG. 3, with Tb being set to 150 ns in the second mode and Tb being set to 0 in the third mode.

As shown in FIG. 4, when the output power is greater than or equal to 350 W, the first mode is most efficient. In this mode, as shown in the time chart of FIG. 2, the charge in the snubber capacitor Cs1 is perfectly discharged in the time period Tb, and it is charged up to the voltage Vin in the time period t3 to t4. When the output power is greater than or equal to 350 W, the loss during ZVS operation (refer to FIG. 2) is substantially larger than the loss due to consumption of power during this charging and discharging operation. Due to this, the control unit CNT selects the soft switching mode, and performs the operation shown in the time chart of FIG. 2.

On the other hand, when the output power is less than 350 W, the third mode is the most efficient, and the second mode is the next most efficient. In the second mode described above, as shown in the time chart of FIG. 3, an amount (the portion) $\alpha$ of the charge in the snubber capacitor Cs1 is discharged in the time period Tb, and it is charged by the amount a in the time period t3 to t4, until the voltage becomes Vin. If during the light load condition the time period Tb is set according to the first mode as shown in FIG. 2, then the loss caused by consumption of power due to charging in the time period t3 to t4 becomes greater than the loss during ZVS operation (refer to FIG. 2), which is undesirable. Thus, during light load, the control unit CNT sets the time period Tb so as to establish the second mode, as shown in FIG. 3. Instead of the second mode, the third mode may also be selected.

With the circuit of this embodiment, the control unit CNT takes the output power of 350 W as a reference, and, for output power greater than or equal to this, it performs switching control in the first mode (the soft switching mode); while, for output power less than 350 W, it performs switching control in the second mode (the hard switching mode, with Tb=150 ns). Below output power of 350 W, it would also be possible to perform switching control in the third mode (the hard switching mode, with Tb=0). However, when the output power is less than 350 W, if switching control is performed in the third mode, then the voltages between the two ends of the switching elements gradually become higher, since the charges in the snubber capacitors are not discharged. Thus, in this type of case, it is desirable to change over from the third hard switching mode to the second hard switching mode periodically, or at irregular intervals.

Furthermore, as other examples of implementation, it would also be possible, in response to the output current becoming smaller, to set the time period Tb to be shorter continuously, or non-continuously.

It should be understood that, if the rated load is taken as 100%, it is desirable to set the load point at which changeover is performed from the soft switching mode (the first mode) to a hard switching mode (the second mode or the third mode) within the range of 30% to 50%

As described above, according to this embodiment, it is possible to improve the efficiency during low load conditions of a DC-DC inverter circuit which is provided with a snubber circuit and a regeneration circuit.

Figure 5:
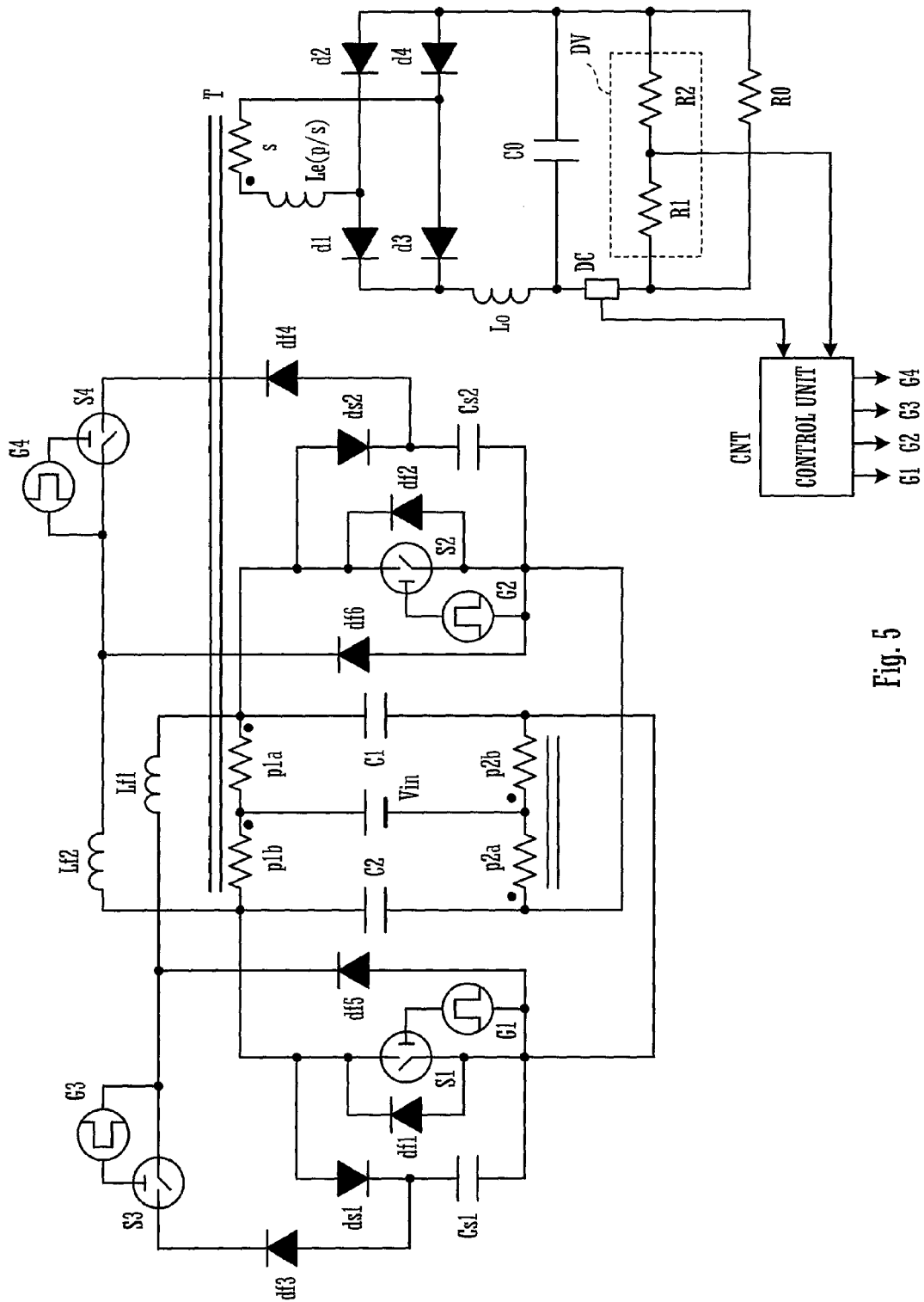
FIG. 5 is a circuit diagram of a DC-DC converter circuit which is a second embodiment of the present invention.

FIG. 5 is a circuit diagram of a DC-DC converter circuit which is a second embodiment of the present invention. This DC-DC converter circuit comprises an inverter circuit, a rectification circuit which is connected to the secondary side of a transformer T, and a control unit CNT. The inverter circuit is built as a current balanced push-pull type (Current Balanced P.P. Type) inverter circuit, and the details thereof will be described hereinafter.

Figure 6:
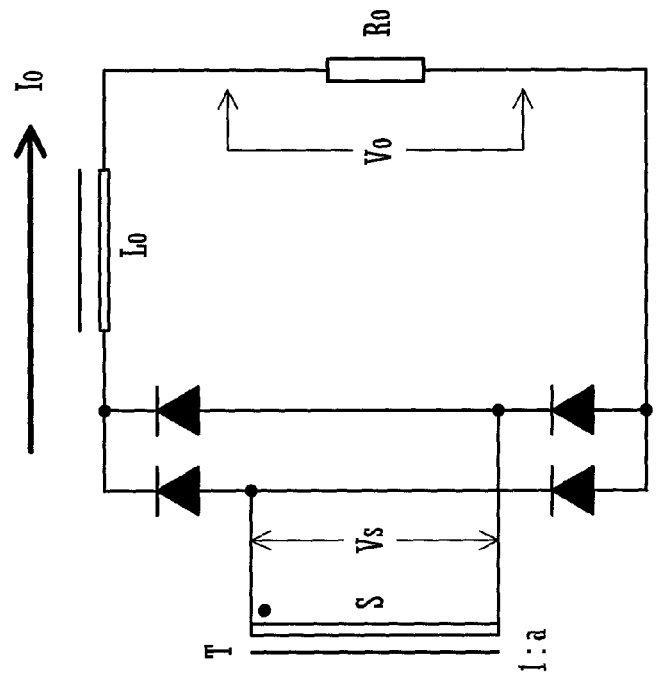
FIG. 6 is a basic structural diagram of a current balanced push-pull type inverter circuit.
Figure 6:
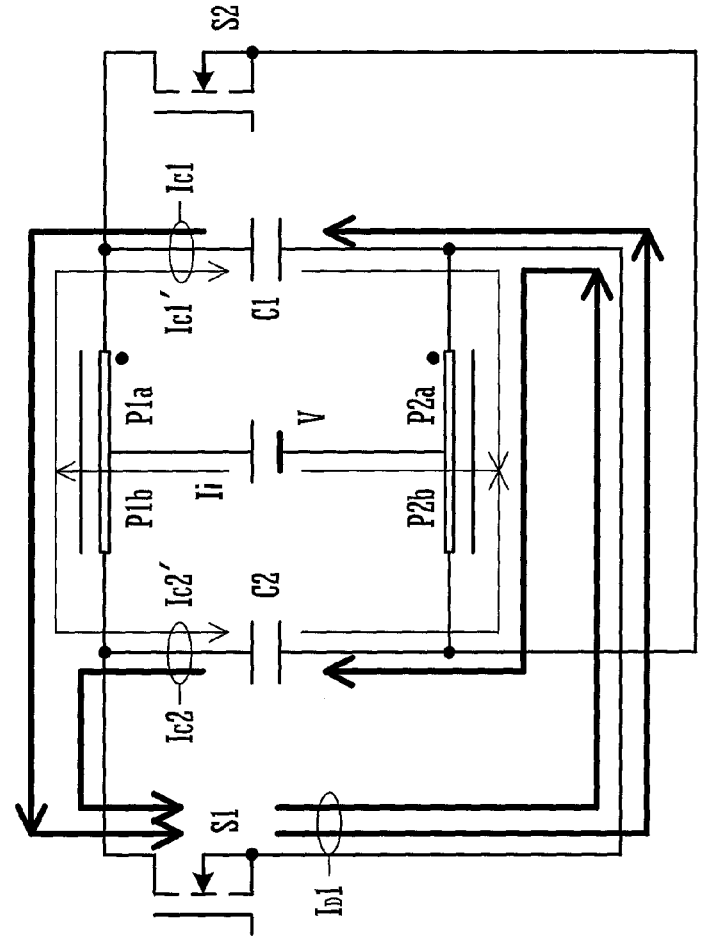

A basic structural diagram of this current balanced push-pull type inverter circuit is shown in FIG. 6.

This inverter circuit comprises a first switching element S1, a second switching element S2, a first primary winding P1 (P1a and P1b) which is connected in series between the positive side of the first switching element S1 and the positive side of the second switching element S2, and a second primary winding P2 (P2a and P2b) which is connected in series between the negative side of the first switching element S1 and the negative side of the second switching element S2. Furthermore, it comprises a power supply V which is connected between a center tap of the first primary winding P1 and a center tap of the second primary winding P2, a capacitor C1, which is a first voltage supply, connected between a first terminal of the first primary winding P1 and a first terminal of the second primary winding P2, and a capacitor C2, which is a second voltage supply, connected between a second terminal of the first primary winding P1 and a second terminal of the second winding P2. A diode bridge rectification circuit, a reactor $L_0$ which smoothes the rectified output, and a load $R_0$ are connected to a secondary winding S of the transformer T.

With the structure described above, the first switching element S1 and the second switching element S2 are alternatingly turned ON and OFF by a control unit not shown in the figures.

When the first switching element S1 is turned ON and voltage is applied to both the first primary winding P1 and the second primary winding P2 by the capacitor C1 which is the first voltage supply and the capacitor C2 which is the second voltage supply, so that an output voltage Vs is generated in the secondary winding S, then an output current $I_0$ flows in the load $R_0$. Due to this, $0.5 \; I_0 \cdot a$ flows in each of the primary windings P1 and P2 (the winding ratio of the transformer is 1:a). At this time, the element current $I_D1$, which is a combination of the current flowing in the switching element S1 from the capacitor C1 and the current flowing in the switching element S1 from the capacitor C2, is:

$$I_D1 = I_0 \cdot a$$

The charging currents (DC) Ic1' and Ic2' of the capacitors C1 and C2 are each half (0.5 Ii) of the output power divided by the power supply voltage. Accordingly, the combined currents which flow to the capacitors C1 and C2 are each the discharge current–the charging current=0.5 ($I_D1$–Ii).

On the other hand, the currents which flow in the primary windings P1a and P2b are obtained by subtracting the charging currents, while the currents which flow in the primary windings P1b and P2a are obtained by adding the charging currents. In other words:

$$IP1a, Ip2b = 0.5(I_D1 - Ii)$$

$$IP1b, Ip2a = 0.5(I_D1 + Ii)$$

This current imbalance presents no problem. The reason why is that the equilibrium of the average winding current is maintained by the switching elements S1 and S2 being turned ON and OFF alternatingly (i.e. by the current commutating). Accordingly, in particular, the problem of the core of the transformer becoming magnetized does not arise.

Furthermore, as seen from the power supply V, the polarities of the windings P1a, P1b, P2a, and P2b are mutually opposite. Due to this, the transformer T is not directly excited by the power supply voltage. Moreover no problem arises of the core being magnetized by direct current, since the charging currents Ic1' and Ic2' which respectively flow in the primary windings P1 and P2 are opposite in direction.

With the structure described above, the alternating voltages applied to each of the first primary winding P1 and to the second primary winding P2 both become equal to the power supply voltage V, which is the same as in the case of a full bridge type inverter. Moreover, the center taps provided to the first primary winding P1 and to the second primary winding P2 are for energy supply from the power supply V, and the entire first primary winding P1 and the entire second primary winding P2 are utilized by the current shown in FIG. 6 by the thick line flowing to the output power supply. Due to this, neither one of the windings becomes idle every half cycle, as in the case of a center tap push-pull type inverter. In other words, there is no requirement to take into consideration leakage inductance between P1a and P1b, and between P2a and P2b, and no surge voltage is generated during current turnaround due to any such leakage inductance. Accordingly there is no need to provide close coupling between P1a and P1b, or between P2a and P2b, or between P1 and P2, with the objective of preventing surge voltage. Furthermore, the charging currents of 0.5 Ii always flow to the capacitors C1 and C2 from the power supply V via the first primary winding P1 and the second primary winding P2. During this charging, the current Ii supplied from the power supply V becomes continuous DC, since the leakage inductance between those windings P1 and P2 functions as a filter which eliminates the ripple component. Due to this, a battery which is utilized as the power supply V may be a battery which is intolerant to ripple component (i.e. whose expected lifetime is lowered by ripple), for example a fuel cell. It should be understood that the combination of the first primary winding P1 and the secondary winding S, and the combination of the second primary winding P2 and the secondary winding S, must be symmetric, because it is necessary to ensure equilibrium of current distribution.

In this manner, with this current balanced push-pull type inverter circuit, there are the advantageous aspects that there is no requirement for high current to flow in the switching elements as in the case of a half bridge type inverter circuit, and moreover that it is also not necessary to provide any countermeasures against surge voltage due to leakage inductance between P1a and P1b or between P2a and P2b.

The DC-DC converter circuit shown in FIG. 5 uses the current balanced push-pull type inverter circuit having the above basic structure. Moreover, similar snubber circuits and regeneration circuits are added to this current balanced push-pull type inverter circuit, as were added to the half bridge type inverter circuit shown in FIG. 1. In other words, these snubber circuits consist of a first snubber circuit RS1 which is connected in parallel with the first switching element S1, and a second snubber circuit RS2 which is connected in parallel with the second switching element S2. Moreover, the regeneration circuits consist of a first regeneration circuit connected between the first snubber circuit and the first capacitor C1, and a second regeneration circuit connected between the second snubber circuit and the second capacitor C2.

The first snubber circuit RS1 is a series circuit of a first snubber diode ds1 and a first snubber capacitor Cs1. And the first regeneration circuit consists of a third switching element S3, a first reactor Lf1, and a first regeneration diode df3. During regeneration, the charge in the snubber capacitor Cs1 is regenerated to the capacitor C1. Similarly, the second snubber circuit is a series circuit of a second snubber diode ds2 and a second snubber capacitor Cs2. And the second regeneration circuit consists of a fourth switching element S4, a second reactor Lf2, and a second regeneration diode df4. During regeneration, the charge in the snubber capacitor Cs2 is regenerated to the capacitor C1. The operation of these snubber circuits and regeneration circuits is the same as than in the case of the half bridge type inverter circuit shown in FIG. 1. It should be understood that while, in FIG. 5, the leakage inductance is shown on the secondary side of the transformer T, this is equivalent to displaying it upon the primary side, as in FIG. 1.

Figure 7:
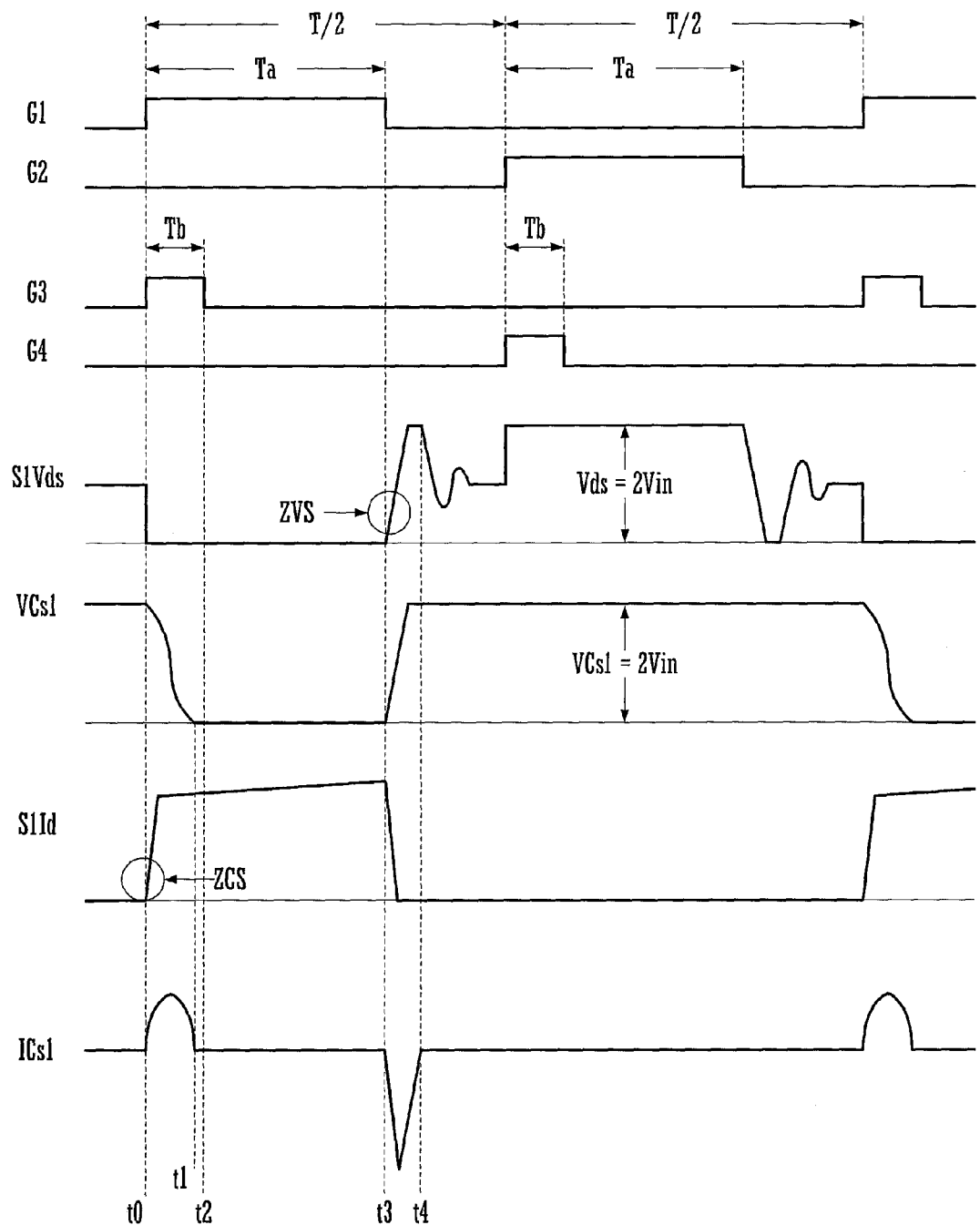
FIG. 7 is a timing chart for a soft switching mode.
Figure 8:
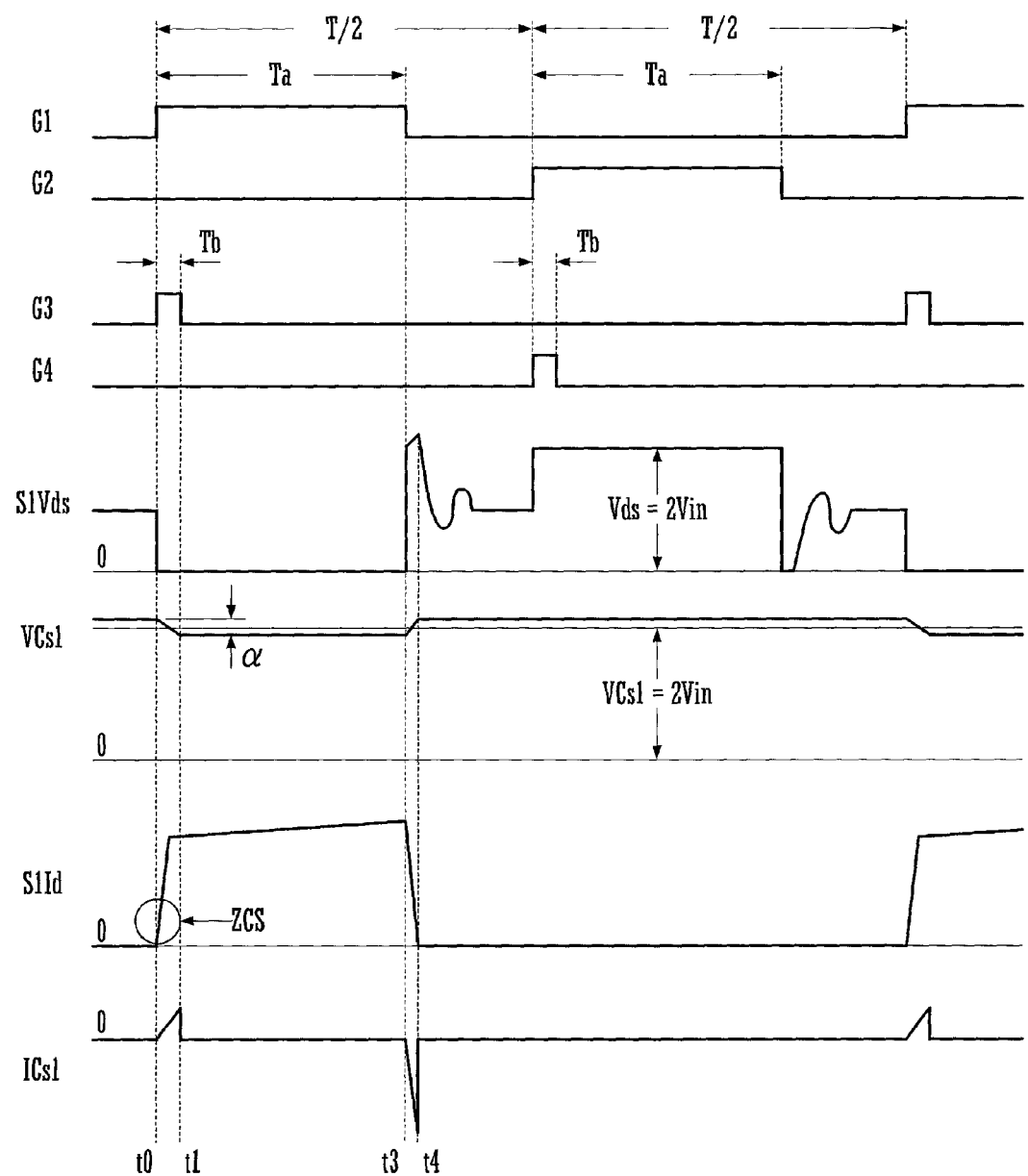
FIG. 8 is a timing chart for a hard switching mode.

With the current balanced push-pull type inverter circuit described above, the control unit CNT controls the time period Tb in a similar manner to the case for the half bridge type inverter circuit shown in FIG. 1. As shown in FIGS. 7 and 8, the operation of the circuit is the same as in the case of FIGS. 2 and 3. The only point of difference is that, in FIGS. 7 and 8, the charging voltage VCs1 of the snubber capacitor Cs1 is clamped to 2 Vin, whereas, in FIGS. 2 and 3, the charging voltage VCs1 is clamped to Vin.

While, in the above embodiments, under control to perform constant voltage output, the current detection sensor (output detection unit) DC was provided which detected the output current on the secondary side of the transformer for detecting the magnitude of the output power, instead of this, it would also be possible to provide a sensor which detects the current upon the primary side. Furthermore, if constant current output is being performed, it would also be possible to provide, on the secondary side of the transformer, a resistance voltage divider circuit which detects output voltage, so as to detect the output power on the basis of the output voltage.

Furthermore it would also be acceptable to provide a circuit which, if the third mode of FIG. 4 is being performed, detects the voltage of the first and second snubber capacitors Cs1 and Cs2, and shortens the ON intervals of the switching elements S3 and S4 when this voltage is greater than or equal to a predetermined value and moreover the load current, or the load voltage, is less than some fixed value. Moreover, it would also be possible to control these ON time periods of these switching elements dynamically, so that the voltages of the snubber capacitors Cs1 and Cs2 do not exceed predetermined values.

The present invention can be applied, not only to the half bridge type inverter circuit described above or to a current balanced push-pull type inverter circuit, but also to a full bridge type inverter circuit or a push-pull type inverter circuit.

The invention claimed is:

1. An inverter circuit, comprising:
a first switching element;
a second switching element;
an output transformer, a primary side whereof is supplied with current via said first switching element and said second switching element, and from a secondary side whereof a current is outputted to a load;
a first free wheel diode connected in inverse parallel to said first switching element;
a second free wheel diode connected in inverse parallel to said second switching element;
a first snubber circuit, connected in parallel to said first switching element, and comprising a series circuit of a first snubber diode and a first snubber capacitor;
a second snubber circuit, connected in parallel to said second switching element, and comprising a series circuit of a second snubber diode and a second snubber capacitor;
a voltage supply which applies voltage to said first switching element and to said second switching element;
a first regeneration circuit connected between said first snubber circuit and to said voltage supply;
a second regeneration circuit connected between said second snubber circuit and to said voltage supply;
and wherein:
said first regeneration circuit includes a series circuit of a third switching element, a first reactor, and a first diode for regeneration;
said second regeneration circuit includes a series circuit of a fourth switching element, a second reactor, and a second diode for regeneration;
and further comprising:
a control unit which turns said first switching element and said second switching element alternatingly ON and OFF, and also turns said third switching element and said fourth switching element alternatingly ON and OFF; and
an output detection unit which detects the magnitude of output power;
and wherein said control unit controls the ON time periods of said third switching element and of said fourth switching element, according to the magnitude of output power detected by said output detection unit, wherein:
said output transformer comprises a first primary winding connected between the positive side of said first switching element and the positive side of said second switching element, and a second primary winding connected between the negative side of said first switching element and the negative side of said second switching element; and
said voltage supply comprises:
a first voltage supply, connected between a first connection point at which said first primary winding is connected to said second switching element, and said first switching element, and which applies a voltage to said first switching element via said first primary winding;
a second voltage supply, connected between a second connection point at which said first primary winding is connected to said first switching element, and said second switching element, and which applies a voltage to said second switching element via said first primary winding; and
a power supply, connected between a center tap of said first primary winding and a center tap of said second primary winding, and which supplies energy to said first and second voltage supplies via said first primary winding and said second primary winding.

2. An inverter circuit according to claim 1, wherein said control unit: when the output power detected by said output detection unit is greater than some fixed power, sets the time period for which said third switching element and said fourth switching element are ON to a time period during which the charges in said first snubber capacitor and said second snubber capacitor are nearly completely discharged; and, when the output power detected by said output detection unit is less than said fixed power, sets the time period for which said third switching element and said fourth switching element are ON to a time period during which the charges in said first snubber capacitor and said second snubber capacitor are partially discharged.

3. An inverter circuit according to claim 1, wherein said control unit: when the output power detected by said output detection unit is greater than some fixed power, sets the time period for which said third switching element and said fourth switching element are ON to a time period during which the charges in said first snubber capacitor and said second snubber capacitor are nearly completely discharged; and, when the output power detected by said output detection unit is less than said fixed power, sets the time period for which said third switching element and said fourth switching element are ON to zero.

4. An inverter circuit according to claim 1, wherein said control unit sets the ON time period for said third switching element and said fourth switching element to be shorter, in response to detection of reduction of output power by said output detection unit.

* * * * *